(12) United States Patent
Choudhury

(10) Patent No.: US 6,169,669 B1
(45) Date of Patent: Jan. 2, 2001

(54) DIGITAL SIGNAL PROCESSOR CONTROLLED UNINTERRUPTABLE POWER SUPPLY

(75) Inventor: Shamim A. Choudhury, Houston, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/617,341

(22) Filed: Jul. 17, 2000

Related U.S. Application Data

(60) Provisional application No. 60/144,570, filed on Jul. 15, 1999.

(51) Int. Cl.[7] ................................. H02M 5/45; H02J 7/00
(52) U.S. Cl. .................................. 363/37; 363/95; 307/66
(58) Field of Search ................................. 363/34, 37, 67, 363/95, 98; 307/64, 66; 320/118

(56) References Cited

U.S. PATENT DOCUMENTS

| | | | |
|---|---|---|---|
| 4,365,295 | * 12/1982 | Katzman et al. | 711/206 |
| 4,535,409 | * 8/1985 | Jindrick et al. | 364/481 |
| 5,289,046 | * 2/1994 | Gregorich et al. | 307/66 |
| 5,666,040 | * 9/1997 | Bourbeau | 320/118 |
| 5,684,686 | * 11/1997 | Reddy | 363/97 |
| 5,889,465 | * 3/1999 | Mercadante et al. | 340/538 |
| 5,982,645 | * 11/1999 | Levran et al. | 363/37 |

* cited by examiner

Primary Examiner—Adolf Deneke Berhane
(74) Attorney, Agent, or Firm—Robert D. Marshall, Jr.; W. James Brady, III; Frederick J. Telecky, Jr.

(57) ABSTRACT

An uninterruptable power supply controlled by a digital signal processor. The digital signal processor periodically senses an input current, an input voltage, a battery current, a battery voltage boost circuit, first and second DC bus voltages, an output current and an output voltage. The digital signal processor controls an AC to DC conversion unit, a battery charger, a battery voltage boost circuit and a DC to AC inverter via an inner current loop and an outer voltage loop. The digital signal processor calculates the inner current loops each predetermined time interval and calculates the outer voltage loops every two predetermined time intervals. The digital signal processor preferably alternately senses a first group of signals consisting of the input voltage, the input current, the output voltage and the output current and a second group of signals consisting of the battery voltage, the battery current, the first DC bus voltage and a second DC bus voltage. The timing of the input signal sensing and the respective current loop and voltage loop calculations are timed by one or more repetitive interrupt timers.

8 Claims, 7 Drawing Sheets

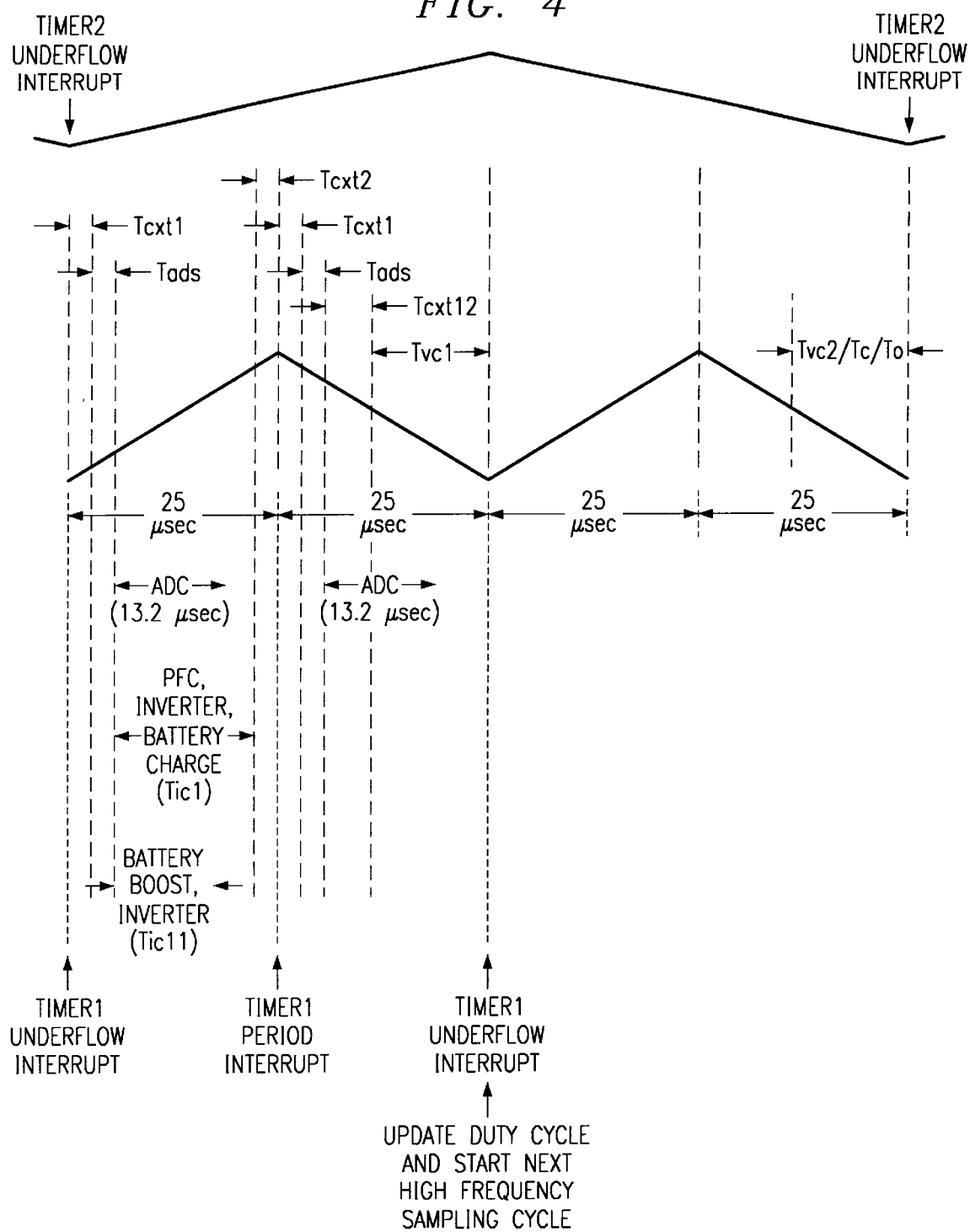

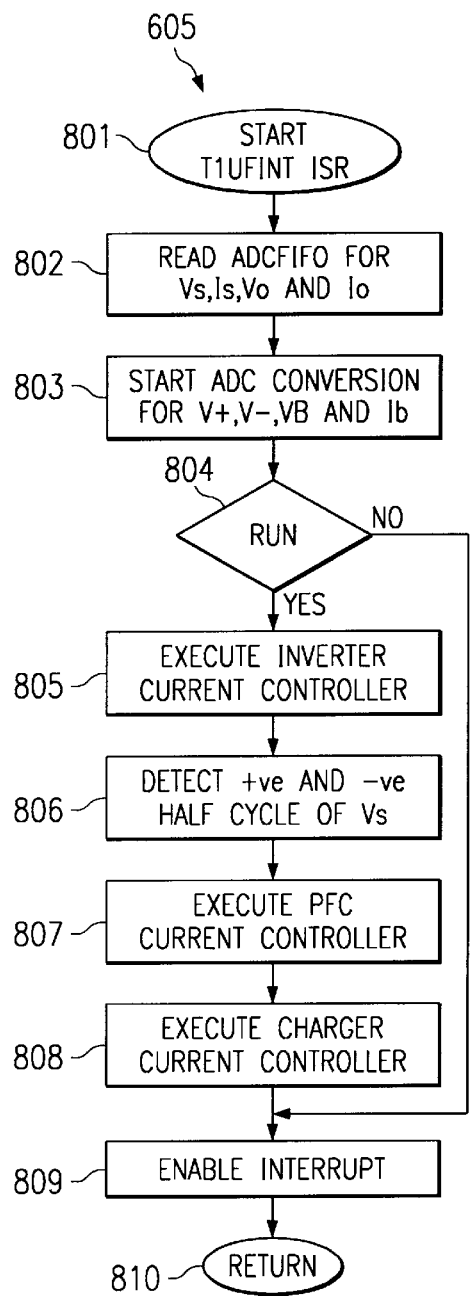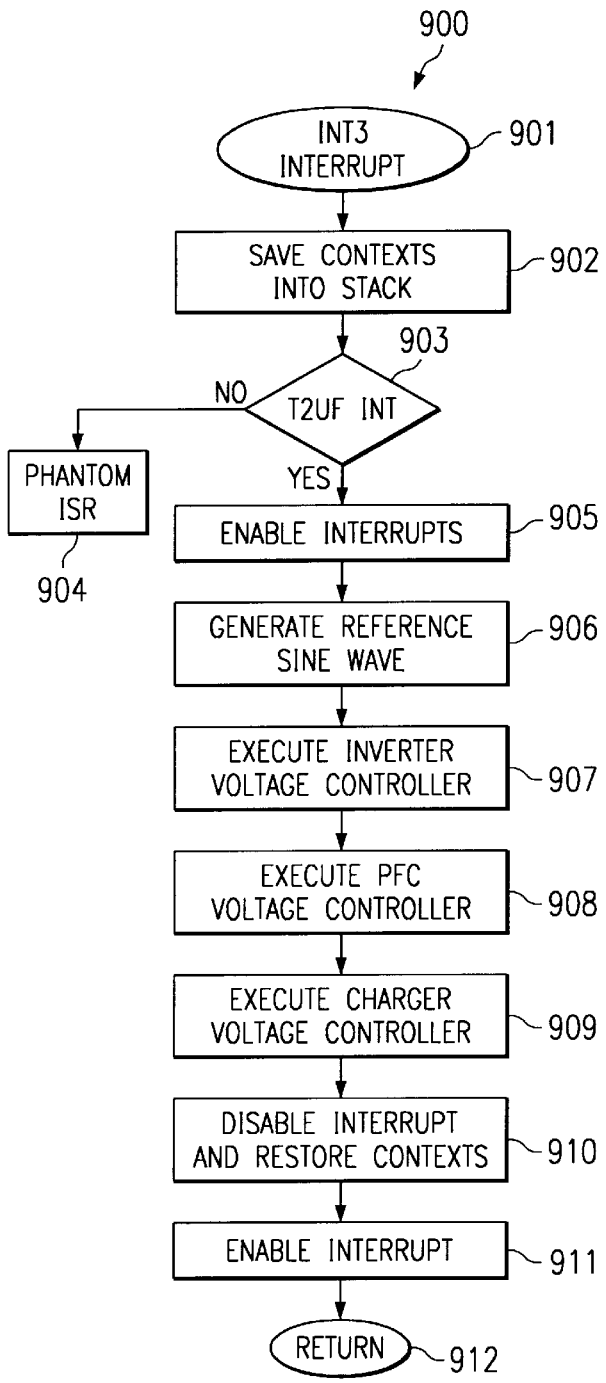
FIG. 8
FIG. 9

DIGITAL SIGNAL PROCESSOR CONTROLLED UNINTERRUPTABLE POWER SUPPLY

This application claims priority under 35 U.S.C. 119(e)(1) from Provisional Patent Application No. 60/144,570 filed Jul. 15, 1999.

TECHNICAL FIELD OF THE INVENTION

The technical field of this invention is uninterruptable power supplies and particularly those controlled by a digital signal processor.

BACKGROUND OF THE INVENTION

Uninterruptable power supplies are used to interface critical equipment such as computers, communications systems, medical/life support systems, industrial systems and the like to an electric power utility. They are designed to provide clean, continuous electric power to the attached equipment under normal and abnormal utility power conditions. Among the types of uninterruptable power supplies those known as on-line UPS or inverter-preferred UPS are believed to offer the best line conditioning performance and the best protection to the attached equipment from utility power irregularities. These type uninterruptable power supplies provide regulated sinusoidal output voltage while maintaining sinusoidal input current at a high input power factor.

These uninterruptable power supplies offer ideal performance for many applications. Such systems provide high performance employing advanced control techniques and systems with fast response time. Analog control systems offer fast response times but have several drawbacks. Analog control systems often rely upon components susceptible to aging and variation with environmental conditions. Analog control systems often require a high component count. Analog control systems typically require circuit modifications to change controller gain or change the control algorithm. Analog control systems are often susceptible to electromagnetic interference. The typical 20 KHZ high frequency analog triangular waveform generation circuit is very sensitive to component tolerances and temperature. Change in component value caused by aging or temperature may cause such problems as DC offset in the output voltage, change in output operating frequency and change in output harmonics. Accordingly digital control of on-line uninterruptable power supplies are seen as advantageous.

SUMMARY OF THE INVENTION

This invention is uninterruptable power supply controlled by a digital signal processor. The uninterruptable power supply includes an AC to DC conversion unit, a battery, a battery charger, a battery boost circuit, a DC to AC inverter and a digital signal processor. The AC to DC conversion unit receives AC power and supplies DC on a DC bus. When AC power is received the battery charger charges the battery from the DC bus. When AC power fails, the battery boost circuit supplies DC power to the DC bus from the battery. The DC to AC inverter generates AC power for a load from the DC bus.

The digital signal processor periodically senses an input current, an input voltage, a battery current, a battery voltage, first and second DC bus voltages, an output current and an output voltage. The digital signal processor controls the AC to DC conversion unit to present a stable input power factor to the AC power input via an inner current loop dependent upon the input current and the outer voltage loop dependent upon an input voltage. The digital signal processor controls the battery charger upon receipt of AC power via an inner current loop dependent upon battery current and an outer voltage loop dependent upon the difference between battery voltage and first DC bus voltage. The digital signal processor controls the battery boost circuit upon failure of AC power via an inner current loop dependent upon battery current and an outer voltage loop dependent upon the difference between the battery voltage and the first DC bus voltage. The digital signal processor controls the DC to AC inverter to supply stable AC power via an inner current loop dependent upon output current and outer voltage loop dependent upon an output voltage.

The digital signal processor calculates the inner current loops controlling the AC to DC conversion unit, the battery charger, the battery boost circuit and the DC to AC inverter each predetermined time interval. The digital signal processor calculates the outer voltage loops in controlling the AC to DC conversion unit, the battery charger, the battery boost circuit and the DC to AC inverter every two predetermined time intervals. The digital signal processor preferably alternately senses a first group of signals consisting of the input voltage, the input current, the output voltage and the output current and a second group of signals consisting of the battery voltage, the battery current, the first DC bus voltage and a second DC bus voltage. The timing of the input signal sensing and the respective current loop and voltage loop calculations are timed by one or more repetitive interrupt timers.

BRIEF DESCRIPTION OF THE DRAWINGS

These and other aspects of this invention are illustrated in the drawings, in which:

FIG. 4 illustrates the sampling cycle of the digital signal processor controlled on-line uninterruptable power supply according to this invention;

FIG. 8 illustrates a flow chart of a second interrupt of the flow chart of FIG. 6;

FIG. 9 illustrates a flow chart of an interrupt service routine illustrated in FIG. 5.

DETAILED DESCRIPTION OF PREFERRED EMBODIMENTS

Figure 1:
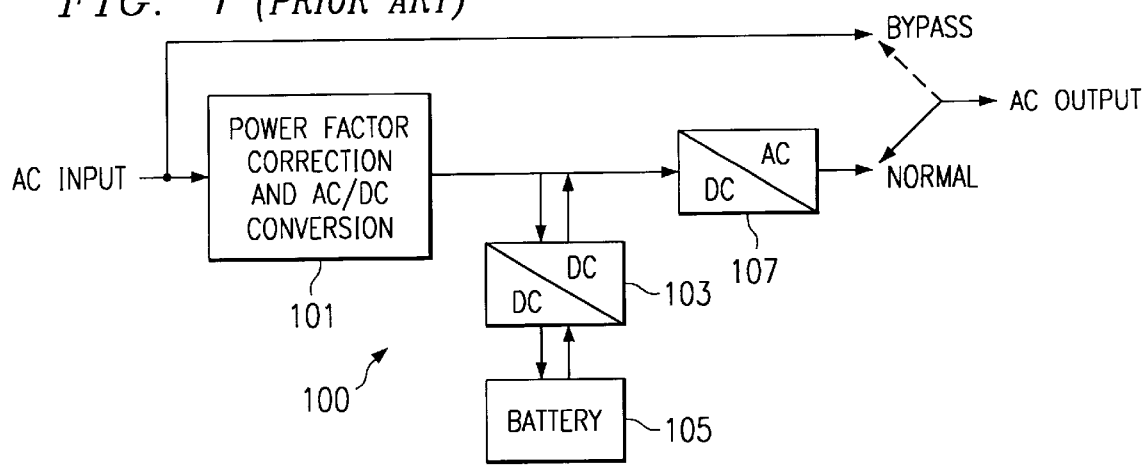
FIG. 1 illustrates a block diagram of a typical on-line uninterruptable power supply according to the prior art.

FIG. 1 illustrates a block diagram of a typical prior art on-line uninterruptable power supply 100. Power factor correction and AC/DC conversion unit 101 is an input stage receiving AC power from the electric utility. Power factor correction and AC/DC conversion unit 101 rectifies the input AC and creates a DC bus voltage while maintaining sinusoidal input current at a high power factor. Power factor correction and AC/DC conversion unit 101 maintains a regulated DC voltage despite variations in the AC input voltage. DC/AC inverter 107 receives this DC bus voltage and generates the appropriate frequency AC voltage used by the attached equipment. DC/DC unit 103 typically has two functions. DC/DC unit 103 has a buck converter that steps down the DC bus voltage, which may be up to 400 volts, to allow battery 105 to be charged. DC/DC unit 103 also steps up the voltage of battery 105 to supply the DC bus voltage when on-line uninterruptable power supply 100 operates in battery backup mode. This example of on-line uninterruptable power supply 100 includes a bypass switch 109 which may connect the attached equipment directly to the electric utility lines.

On-line uninterruptable power supply 100 has two operating modes. Under normal conditions AC power from the electric utility is available at the input. Under such normal conditions power factor correction and AC/DC conversion unit 101 and DC/AC inverter 107 operate simultaneously to power the attached equipment. Under normal conditions DC/DC unit 103 takes power from the DC bus and charges battery 105. On-line uninterruptable power supply 100 changes to battery backup mode upon failure of the input AC power. When in battery backup mode power factor correction and AC/DC conversion unit 101 is idle because there in no input AC power. DC/DC unit 103 supplies the DC bus voltage from battery 105. As noted above this may involve a DC to DC voltage step up. DC/AC inverter 107 operates as in the normal mode supplying AC power of an appropriate frequency to the attached equipment from the DC bus voltage, which is now supplied from battery 105.

Figure 2:
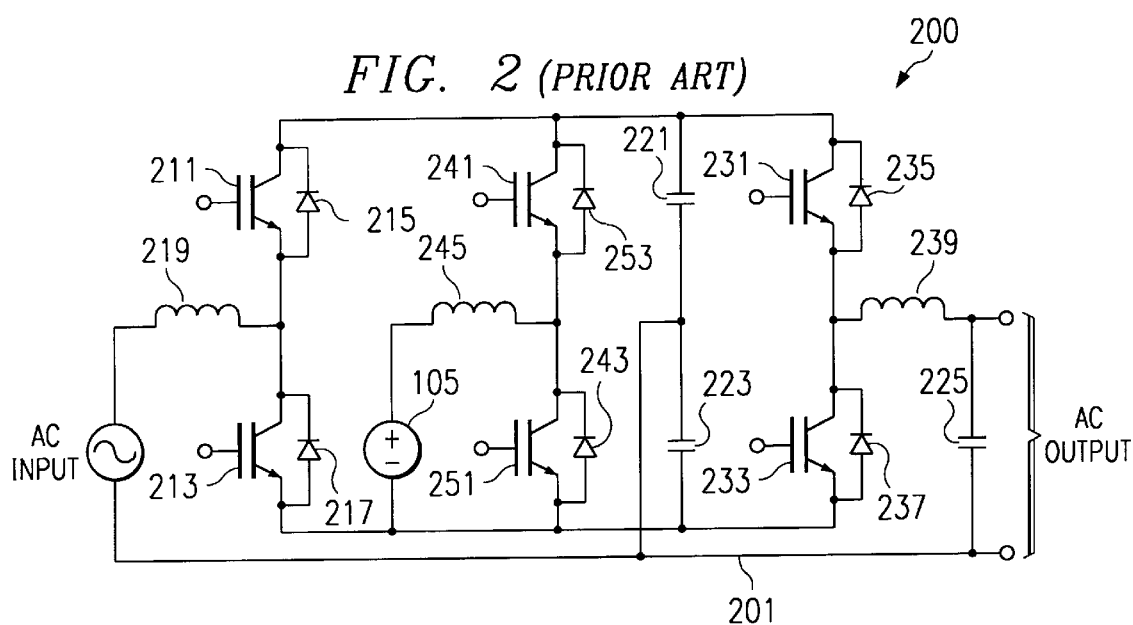
FIG. 2 illustrates a circuit schematic of a typical on-line uninterruptable power supply according to the prior art.

FIG. 2 is a schematic diagram of a circuit 200 of the prior art typically used to embody the on-line uninterruptable power supply 100 illustrated in FIG. 1. As clearly seen in FIG. 2, this circuit uses a common neutral line 201 for the input and output. Such a common neutral line is required for regulation without a transformer. The input power factor control portion of circuit 200 includes transistors 211 and 213, diodes 215 and 217, input inductor 209 and bus capacitors 221 and 223. These parts provide power factor correction and boost the DC bus voltage to about 400 volts. The output inverter portion of circuit 200 includes bus capacitors 221 and 223, transistors 231 and 233, diodes 235 and 237, output inductor 239 and output capacitor 225. These parts generate a sinusoidal output voltage which is supplied to the attached equipment. The battery charger portion of circuit 200 includes transistor 241, diode 243 and inductor 245. These parts form a DC/DC buck circuit which allows charging of a 110 volt battery 105 from the 400 volt DC bus. The battery voltage boost portion of circuit 200 includes transistor 251, diode 253, inductor 245 and capacitors 221 and 223. These parts act as a DC/DC boost circuit forming a 400 volt DC bus voltage from 110 volt battery 105. These parts are enabled only in battery backup mode.

It should be clear to one skilled in the art that control of the gate drive to transistors 211, 213, 231, 233, 241 and 251 are key to performance of circuit 200. This invention proposes a programmed digital signal processor as the controller of these transistor gates.

Figure 3:
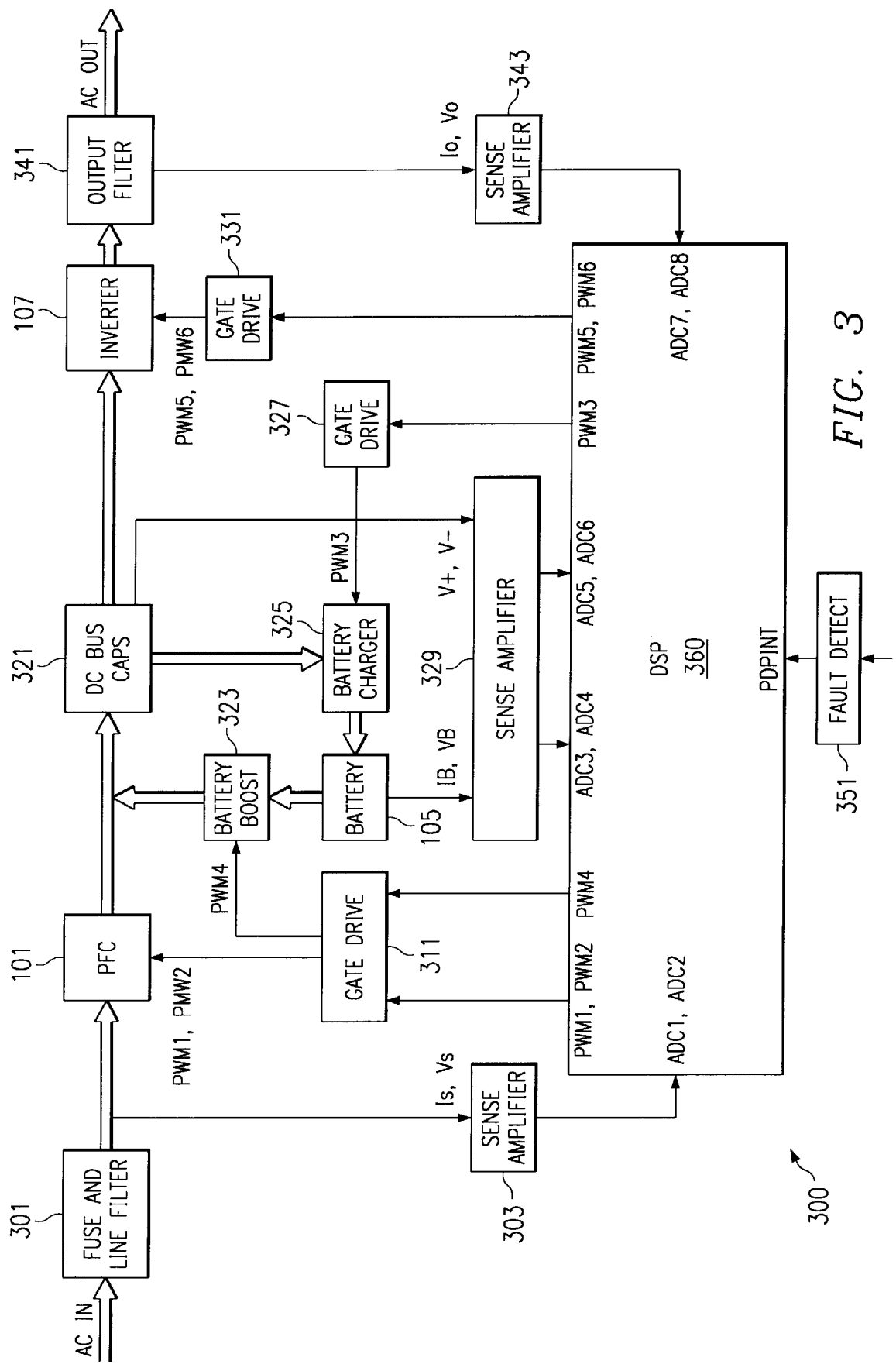
FIG. 3 illustrates a block diagram of a digital signal processor controlled on-line uninterruptable power supply according to this invention.

FIG. 3 illustrates a block diagram of the on-line uninterruptable power supply 300 of this invention employing digital signal processor 360 controlling the transistor gate drive. Parts the same as those illustrated in FIG. 1 are given the same reference numbers. On-line uninterruptable power supply 300 includes fuse and AC line filter 301 receiving the input AC power from the electric utility and supplying input to power factor correction and AC/DC conversion unit 101. DC/DC unit 103 illustrated in FIG. 1 is represented by DC bus capacitors 321, battery boost circuit 323 and battery charger 325. Both battery boost circuit 323 and battery charged 325 are connected to battery 105. The DC voltage bus as regulated by DC bus capacitors 321 is supplied to DC/AC inverter 107. As previously described, DC/AC inverter 107 generates an AC voltage of appropriate frequency from DC power on the DC voltage bus. FIG. 3 further illustrates output filter 341 between DC/AC inverter 107 and the AC output.

Eight signals are sampled and supplied to digital signal processor 360. The input current $I_S$ and input voltage $V_S$ between fuse and line filter 301 and power factor correction and AC/DC conversion unit 101 are sensed by sense amplifier 303. These conditioned signals are supplied to respective first and second analog to digital conversion inputs ADC1 and ADC2 of digital signal processor 360. The battery current $I_B$ and battery voltage $V_B$ of battery 105 are sensed by sense amplifier 329. The conditioned signals are supplied to respective third and fourth analog to digital conversion input ADC3 and ADC4 of digital signal processor 360. Sense amplifier 329 also senses the voltages at capacitors 221 and 223 (FIG. 2) from DC bus capacitors 321 as respective signals V+ and V−. The conditioned signals are supplied to respective fifth and sixth analog to digital converters ADC5 and ADC6 of digital signal processor 360. Lastly, the output current $I_O$ and output voltage $V_O$ from output filter 341 are sensed by sense amplifier 343. Conditioned signals are supplied to respective seventh and eighth analog to digital converter inputs ADC7 and ADC8 of digital signal processor 360.

Digital signal processor 360 produces 6 pulse width modulated outputs PWM1, PWM2, PWM3, PWM4, PWM5 and PWM6. These output signals are used to control the gates of transistors 211, 213, 231, 232, 241 and 251 as follows. The first and second pulse width modulated outputs PWM1 and PWM2 are used to control respective transistors 211 and 213 (FIG. 2) of power factor correction and AC/DC conversion unit 101 via gate drive circuit 311. The third pulse width modulated output PWM3 controls the gate of transistor 241 (FIG. 2) via gate drive circuit 327. The fourth pulse width modulated output PWM4 controls the gate of transistor 251 (FIG. 2) via gate drive circuit 311. The fifth and sixth pulse width modulated outputs PWM5 and PWM6 control respective transistors 231 and 233 via gate drive circuit 331. An overcurrent fault detector 351 and interrupt digital signal processor 360 upon detection of an overcurrent or short circuit via interrupt input PDPINT.

In operation digital signal processor 360 receives the 8 input signals at the 8 analog to digital converter inputs ADC1 to ADC8. Digital signal processor 360 executes respective inner and outer loop control algorithms via a stored program. Digital signal processor 360 then controls the process via supply of gate signals to transistors 211, 213, 231, 233, 241 and 243 via respective pulse width modulated outputs PWM1, PWM2, PWM3, PWM4, PWM5 and PWM6. The control algorithm executed is described below in conjunction with the waveform of FIG. 4, the flow charts of FIGS. 5 to 9 and the equivalent control processes illustrated in FIGS. 10 to 13. Digital signal processor 360 is preferably embodied in a Texas Instruments TMS320C240 digital signal processor. This processor includes within the same integrated circuit a digital signal processor core, analog to digital converters coupled to the 8 inputs (ADC1, ADC2, ADC3, ADC4, ADC5, ADC6, ADC7 and ACD8) and at least six pulse width modulated outputs (PWM1, PWM2, PWM3, PWM4, PWM5 and PWM6). This part additionally includes two programmable general purpose timers Timer1 and Timer2 that at used in the algorithm as described below. The digital processor core of this Texas Instruments' digital signal processor is believed to have sufficient computational capacity to execute the algorithms described below in real time, that is while on-line uninterruptable power supply 300 is operating.

FIG. 4 illustrates a sampling cycle used in the on-line uninterruptable power supply of this invention. A programmable first general purpose timer Timer1 provides the time base for the pulse width modulated outputs PWM1, PWM2, PWM3, PWM4, PWM5 and PWM6 and high frequency current ($I_S$, $I_B$, $I_O$) control loops. A second programmable general purpose timer Timer2 provides the time base for low frequency voltage control loops. These timers will be described in conjunction with the preferred embodiment of count down timers reloaded upon underflow or count down to zero. Those skilled in the art would realize that counting up to a predetermined number and then resetting the count to zero realizes the same result. In the preferred embodiment the current control loop has a frequency of 20 KHz and thus a sampling interval of 50 microseconds. The voltage control loop has a frequency of 10 KHz and thus a sampling interval of 100 microseconds. Digital signal processor 360 is configured to permit program interrupt upon underflow (time out) or period match of Timer1 and upon underflow only of Timer2.

FIG. 4 illustrates the timing of events during one cycle of Timer2 and two cycles of Timer1 a total of 100 microseconds. Note that these timers are synchronized. Timer2 underflows every other underflow of Timer1. As shown in FIG. 4, both Timer1 underflow (T1UF) interrupt and Timer2 underflow (T2UF) interrupt occur at the same time. The T1UF interrupt is serviced first, because it generates a higher priority interrupt. Beginning at the initial Timer1 underflow interrupt illustrated in FIG. 4, it takes a time Tcxt1 for interrupt source identification and context saving. Following that, the interrupt service routine (ISR) reads data registers of four of the analog-to-digital converters and the conversion results from these four previous conversions are saved. Next the analog-to-digital converters are configured to start four new conversions of the other four signals sampled. Saving the prior analog-to-digital conversion results and starting new conversions require a time Tads. Once the analog-to-digital conversion starts, the conversion and current control loop calculation run in parallel. Note that the analog to digital conversion is a hardware function of digital signal processor 360 and the current control loop is a software function. The time required for current control loop calculation is Tic1 in normal mode and Tic11 in backup mode. Once these operations are complete, a time Tcxt2 is required to restore the context before the program returns from this servicing this interrupt.

After exiting this interrupt service routine, digital signal processor 360 acknowledges an interrupt from a period match on Timer1 (T1PINT). This interrupt has a higher priority than the Timer2 underflow, therefore the servicing of the pending Timer2 underflow interrupt is further delayed to service the Timer1 period match interrupt. A time Tcxt1 is needed for interrupt source identification and context saving. Following that, the interrupt service routine reads the analog-to-digital converter data registers and the conversion results from the previous four conversions are saved. Then the analog-to-digital converter control registers are configured for starting four new conversions. Saving the analog-to-digital conversion results and starting the new conversions require a time Tads. Once the analog-to-digital conversion starts, the program restores the saved context and returns from this interrupt.

Digital signal processor 360 next services the pending Timer 2 underflow interrupt. A time Tcxt12 is required to identify the interrupt source, to save this context and restore the context of the Timer1 period match interrupt. Once this is done, this interrupt service routine executes the voltage control loops. The time spent in calculating the voltage control loop is Tvc1. If this calculation does not complete before the next Timer1 underflow interrupt occurs, this Timer2 underflow interrupt is interrupted by the Timer1 underflow interrupt. When this happens, the remaining portion of the voltage control loop is calculated after servicing the next Timer1 underflow interrupt and the following Timer1 period match interrupt. This later time is shown as Tvc2. Once the voltage control loop calculation is complete, digital signal processor 360 allows the implementation of interactive communication during time Tc and other functions during time To.

Figure 5:
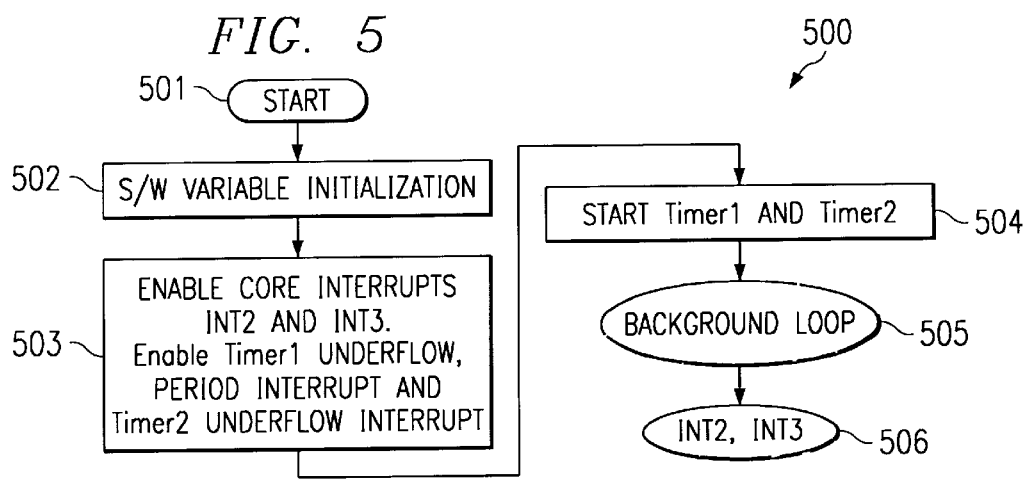
FIG. 5 illustrates a flow chart of the main program of the digital signal processor of the a digital signal processor controlled on-line uninterruptable power supply according to this invention.

FIG. 5 is a flow chart of main program 500 running on digital signal processor 360 according to the preferred embodiment of this invention. Program 500 begins with start block 501 and then initializes various variables (processing block 502). Program 500 then enables interrupts INT2 and INT3, enables Timer1 and Timer2, sets the Timer 1 initial count and match count and sets the Timer2 initial count (processing block 503). This sets up Timer1 and Timer2 for use. Program 500 then starts both Timer1 and Timer2 (processing block 504). Program 500 then enters a background loop program (processing block 505). This background loop program could be any non-time critical function. While running in this background loop, program 500 may be interrupted by either interrupts INT2 or INT3 (processing block 506).

Figure 6:
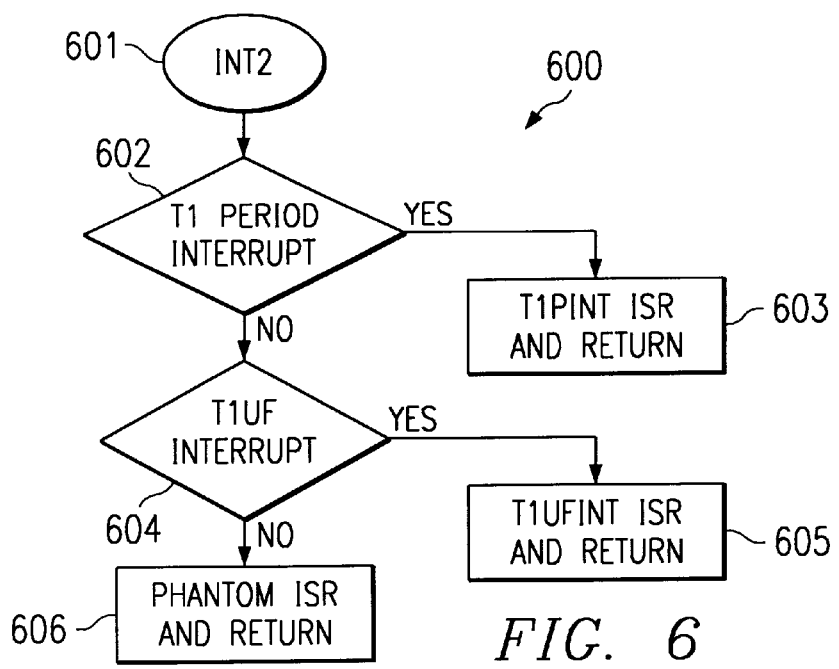
FIG. 6 illustrates a flow chart of the first interrupt dispatcher of the program of the digital signal processor of a digital signal processor controlled on-line uninterruptable power supply according to this invention.

FIG. 6 is a flow chart illustrating the INT2 interrupt service routine 600. Interrupt service routine 600 is started by receipt of interrupt INT2 (start block 601). Interrupt INT2 may be generated by Timer1 underflow or Timer1 period match. Interrupt service routine 600 first checks to determine if the interrupt was generated by a period match (decision block 602). If the interrupt was generated by a period match (Yes at decision block 602), then interrupt service routine 600 runs a Timer1 period match interrupt service routine (T1PINT) and returns (processing block 603). This routine will be further described below at FIG. 7. If the interrupt not was generated by a period match (No at decision block 602), then interrupt service routine 600 checks to determine if the interrupt was generated by an underflow (decision block 605). If the interrupt was generated by an underflow (Yes at decision block 604), then interrupt service routine 600 runs a Timer1 underflow interrupt service routine (T1UFINT) and returns (processing block 605). This routine will be further described below at FIG. 8. If the interrupt not was generated by an underflow (No at decision block 604), then interrupt service routine 600 runs a phantom interrupt service routine and returns (processing block 606).

Figure 7:
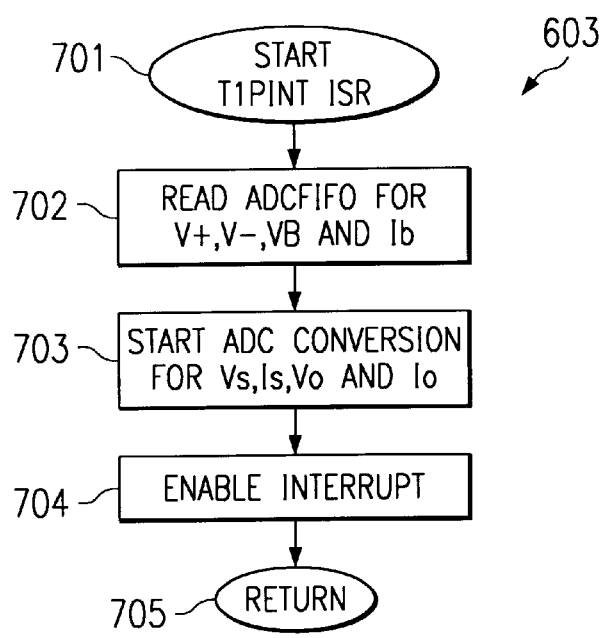
FIG. 7 illustrates a flow chart of a first interrupt of the flow chart of FIG. 6.

FIG. 7 illustrates Timer1 period match interrupt service routine (T1PINT) 603 of FIG. 6. Timer1 period match interrupt service routine 603 begins at start block 701. Timer1 period match interrupt service routine 603 reads four signals previously sampled by the analog-to-digital converters and stored in a first-in-first-out (FIFO) memory (processing block 702). These four signals are: battery current $I_B$ at ADC3; the battery voltage $V_B$ at ADC4; the capacitor 221 voltage V+ at ADC5; and the capacitor 223 voltage V− at ADC6. Timer1 period match interrupt service routine 603 then starts the sampling and conversion process for the other four sensed signals (processing block 703). These other four signals are: input current $I_S$ at ADC1; input voltage $V_S$ at ADC2; output current $I_O$ at ADC7; output voltage $V_O$ at ADC8. Timer1 period match interrupt service routine 603 then re-enables interrupts disabled upon start of this routine (processing block 704) and returns (processing block 705).

FIG. 8 is a flow chart of Timer1 underflow interrupt service routine 605 of FIG. 6. Timer1 underflow interrupt service routine 605 begins at start block 601. Timer1 underflow interrupt service routine 605 reads four signals previously sampled by the analog-to-digital converters and stored in a first-in-first-out (FIFO) memory (processing block 802). These four signals are: input current $I_S$ at ADC1; input voltage $V_S$ at ADC2; output current $I_O$ at ADC7; output voltage $V_O$ at ADC8. Timer1 underflow interrupt service routine 605 then starts the sampling and conversion process for the other four sensed signals (processing block 803). These other four signals are: battery current $I_B$ at ADC3; the battery voltage $V_B$ at ADC4; the capacitor 221 voltage V+ at ADC5; and the capacitor 223 voltage V− at ADC6. Timer1 underflow interrupt service routine 605 checks to determine if it is running (decision block 805). If it is in a debug mode and not running (No at decision block 804), then Timer1 underflow interrupt service routine 605 re-enables interrupts disabled at the start of the ISR (processing block 809) and returns (processing block 810). Thus the following control processes are not changed. If it is running (Yes at decision block 804), then Timer1 underflow interrupt service routine 605 executes an inverter current control routine (processing block 805). This will be further explained below in conjunction with FIG. 10. Interrupt service routine 605 then detects polarity of the input voltage $V_S$ (processing block 806). Note that some of the control processes depend upon the current polarity of the input voltage. Interrupt service routing 605 then executes a power factor correction current routine (processing block 807). This will be further explained below in conjunction with FIG. 12. Interrupt service routine 605 then executes a charge current control routine (processing block 808) as further detailed below in conjunction with FIG. 11. Then Timer1 underflow interrupt service routine 605 re-enables interrupts triggered by an underflow of Timer2 and returns (processing block 810).

FIG. 9 is a flow chart of Timer2 underflow interrupt service routine 900. Timer2 underflow interrupt service routine 900 begins at start block 901. Timer2 underflow interrupt service routine 900 first saves the contexts into a stack (processing block 902). Timer2 underflow interrupt service routine 900 checks to determine if the interrupt INT3 was triggered by an underflow of Timer2 (decision block 903). If not triggered by an underflow of Timer2 (No at decision block 903), then Timer2 underflow interrupt service routine 900 executes a dummy interrupt service routine and returns (processing block 904). If triggered by an underflow of Timer2 (Yes at decision block 903), then Timer2 underflow interrupt service routine 900 enables interrupts disabled at the start of the ISR (processing block 905). This permits the Timer2 interrupt service routine 900 to be interrupted by the Timer1 interrupt service routing 600. Timer2 underflow interrupt service routine 900 then generates a reference sine wave (processing block 906). This reference sine wave is used in the inverter control process illustrated in FIG. 10. Interrupt service routine 900 executes an inverter voltage control routine (processing block 907) described below in conjunction with FIG. 10. Next interrupt service routine 900 executes a power factor correction voltage routine (processing block 908), which will be described in conjunction with FIG. 12. Interrupt service routine 900 then executes a charge voltage control routine (processing block 909) as described below in conjunction with FIG. 10. Timer2 underflow interrupt service routine 900 then disables interrupts and restores the contexts from the stack (processing block 910). Lastly, Timer2 underflow interrupt service routine 900 enables interrupts (processing block 911) and returns (processing block 912).

Figure 10:
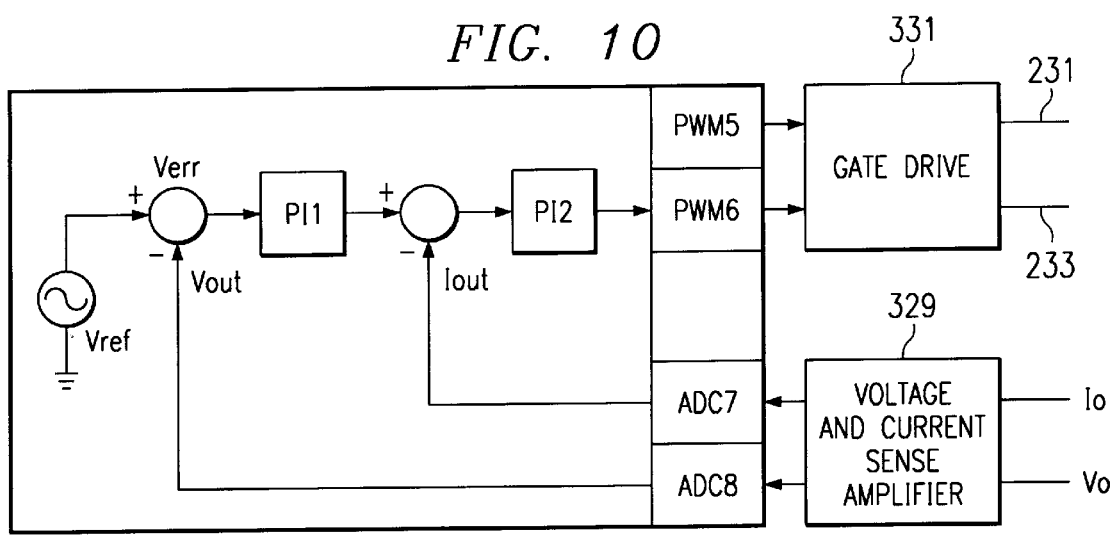
FIG. 10 illustrates the equivalent control process of the output inverter stage performed by the digital signal processor.

FIG. 10 illustrates the equivalent control process performed by digital signal processor 360 for the DC/AC inverter. The DC/AC inverter modulates the DC bus voltage into a cycle-by-cycle average output voltage. This control process receives the output current $I_O$ on analog to digital conversion input ADC7 and the output voltage $V_O$ on analog to digital conversion input ADC8. This control process forms two pulse width modulated outputs PWM5 and PWM6 which control respective transistors 231 and 233 via gate drive circuit 331. The amplitude of the inverter output voltage is directly proportional to the commanded duty cycle of the inverter and the amplitude of the DC bus voltage. Current mode control is used for this pulse width modulation inverter. Current mode control is a two-loop control system that simplifies the design of the outer voltage control loop and improves UPS performance in many ways, including better dynamics and a feed forward characteristic that could be used to compensate DC bus ripple and dead-time effect, etc. The digitized output voltage $V_{out}$ is compared to an internally generated sine wave reference $V_{ref}$. This sine wave reference voltage is preferably generated by processing block 906 of interrupt service routine 900. The difference between these two voltages $V_{err}$ is fed to a first compensator. The output of this compensator is the reference current command for the inner current loop. This reference current is compared with the digitized inductor current feedback $I_{out}$ and then the difference is passed to a second compensator. The output of this second compensator is used to determine the duty cycle of the pulse width modulated output signals PWM5 and PWM6. The manner of generating the pulse width modulation signals will be more fully explained in conjunction with FIG. 12. The pulse width modulated signals PWM5 and PWM6 control respective transistors 231 and 233 via gate drive 331. In the preferred embodiment the current loop sampling frequency is 20 KHZ and the voltage loop sampling frequency is 10 KHZ.

Figure 11:
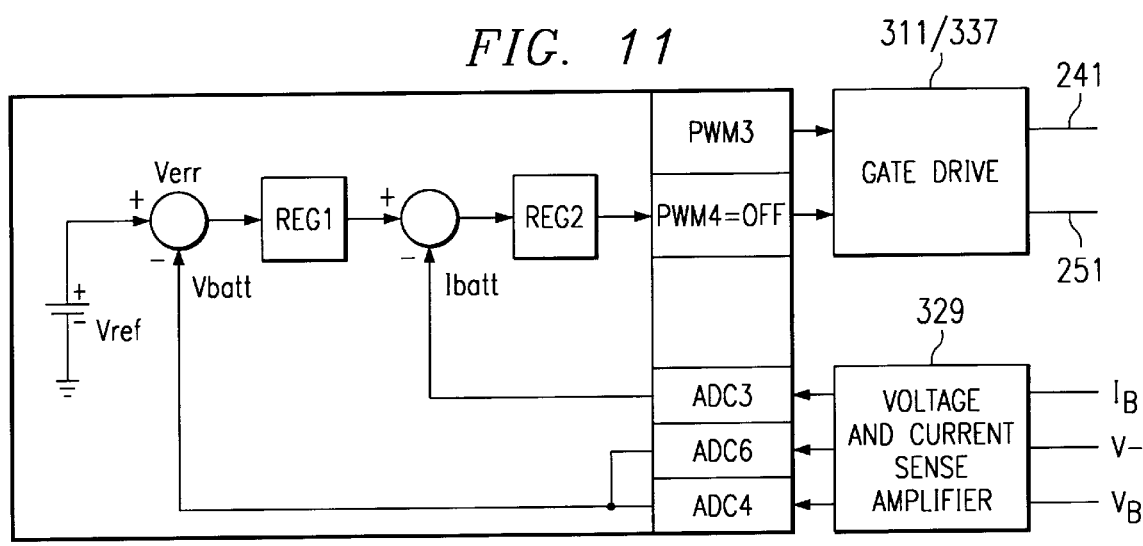
FIG. 11 illustrates the equivalent control process of the battery charger performed by the digital signal processor.

FIG. 11 illustrates the equivalent control process of the battery charger performed by digital signal processor 360. The battery charger employs transistor 241 and inductor 245 and operates only when electric power is received at the AC input. This is basically a DC/DC buck converter which allows charging of the 110 volt DC battery 105 from the 400 volt DC bus. Three signals are sensed for this control algorithm: the battery inductor current $I_B$ sensed at ADC3, the battery voltage $V_B$ with respect to ground and the voltage V− at capacitor 223 with respect to ground. The difference between $V_B$ and V– yields the battery terminal voltage $V_{batt}$. There are three phases of change dependent upon the battery open circuit voltage (OCV). If the open circuit voltage is less than 1.80V, the charging procedure begins with a trickle charge. As soon as open circuit voltage exceeds 1.80V, the operation turns into a bulk charge mode. In the preferred embodiment, the charging current is limited to 2 Amperes whatever the battery open circuit voltage reaches 2.40V. When the cell open circuit voltage reaches 2.40V, the operation becomes an over charge mode. At this time, the charge control switches from constant charging current to constant charging voltage. The battery cell voltage is regulated at 2.40 V, while the charging current is tapped down continuously. In the over charge mode illustrated in FIG. 11, the calculated battery voltage $V_{batt}$ is compared with a reference voltage $V_{ref}$. The difference between these two voltages $V_{err}$ is fed to a first compensator. The output of this compensator is the reference current command for the inner current loop. This reference current is compared with the digitized battery current $I_{batt}$ and then the difference is passed to a second compensator. The output of this second compensator is used to determine the duty cycle of the pulse width modulated output signal PWM3. The pulse width modulated signal PWM3 controls transistor 241 via gate drive 327. Note that pulse width modulated signal PWM4 turns transistor 251 off when charging battery 105.

Figure 12:
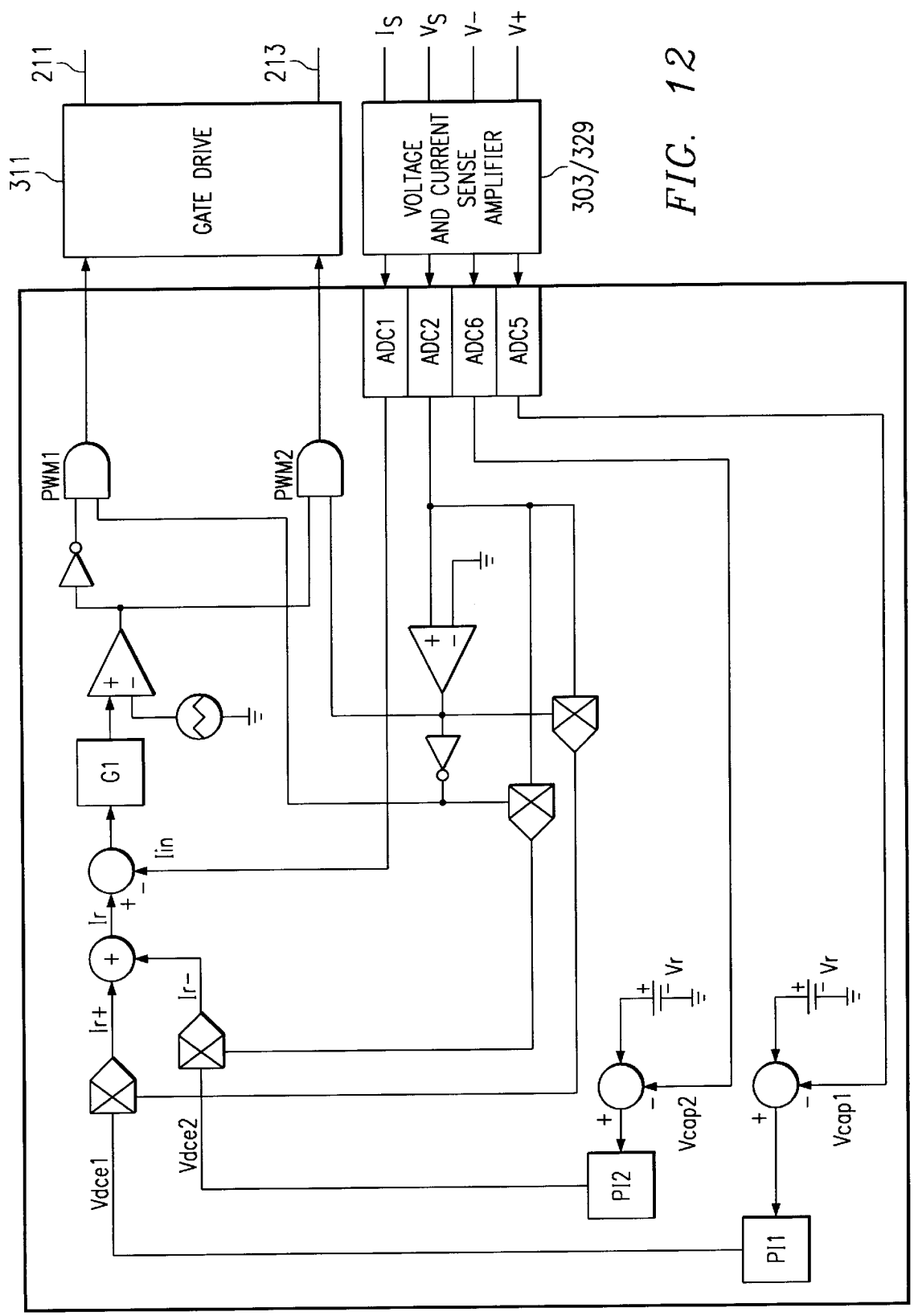
FIG. 12 illustrates the equivalent control process of the power factor correction performed by the digital signal processor.

FIG. 12 illustrates the equivalent control process of the power factor correction performed by digital signal processor 360. Power factor correction and AC/DC conversion unit 101 consists of transistors 211 and 213, diodes 215 and 217, input inductor 209 and bus capacitors 221 and 223. Four signals are used to implement the control algorithm: the input voltage $V_S$; the input inductor current $I_S$; and the two DC bus voltages V+ and V–. The converter is controlled by two feedback loops. The average output DC voltage is regulated by a slow response outer loop; whereas, the inner loop that shapes the input current is a much faster loop.

As shown in FIG. 12, the instantaneous signals V+, V–, $V_S$ and $I_S$, are sensed and conditioned by the voltage and current sense amplifiers 303 and 329. The sensed signals V+, V–, $V_S$, and $I_S$ are fed to digital signal processor 360 by the four ADC channels ADC5, ADCS, ADC2, and ADC1, respectively. The digitized sensed voltages V+ and V– are each compared to the desired reference voltage $V_r$. The difference between the reference $V_r$ and each of the digitized voltages $V_{cap1}$ and $V_{cap2}$ are fed into respective compensators. The respective outputs $V_{dce1}$ and $V_{dce2}$ are multiplied by the sinusoidal input voltage $V_S$ to generate the reference current $I_r$ for the inner current loop. The reference current Ir has sinusoidal wave shape and an amplitude to maintain the output DC voltage at a reference level $V_r$ against variation in load and fluctuation in line voltage from its nominal value. The positive and negative half cycles of reference current $I_r$ are $I_{r+}$ and $I_{r-}$, respectively. The amplitude of $I_{r+}$ is set so that the voltage across capacitor 221 is maintained at the reference voltage level $V_r$ during the positive half cycle of the input supply voltage. Similarly, the amplitude of $I_{r-}$ is set so that the voltage across capacitor 223 is maintained at the reference voltage level $V_r$ during the negative half cycle of the input supply voltage. The reference $I_{r+}$ is obtained by multiplying the positive half of the input sinusoidal voltage with $V_{dce1}$. The reference $I_{r-}$ is obtained by multiplying the negative half of the input sinusoidal voltage with $V_{dce2}$. A current sensor senses the actual input inductor current $I_s$, whose digitized form is called $I_{in}$. The difference between $I_r$ and $I_{in}$ is passed into a compensator. The output of this compensator is used to generate the pulse width modulated gating signals, PWM1 and PWM2.

FIG. 12 illustrates additional detail of the manner of generation of the pulse width modulated signals. The current signal is compared with a 20 KHz triangle waveform generated internally by Timer1 (See FIG. 4). The result of this comparison is the pulse width modulated signals PWM1 and PWM2 which control transistors 211 and 213, respectively via gate drive 311. During the positive half cycle of the input voltage transistor 213 Is driven on and transistor 211 is turned off. During the negative half cycle of the input voltage, transistor is driven on and transistor 213 is turned off.

Figure 13:
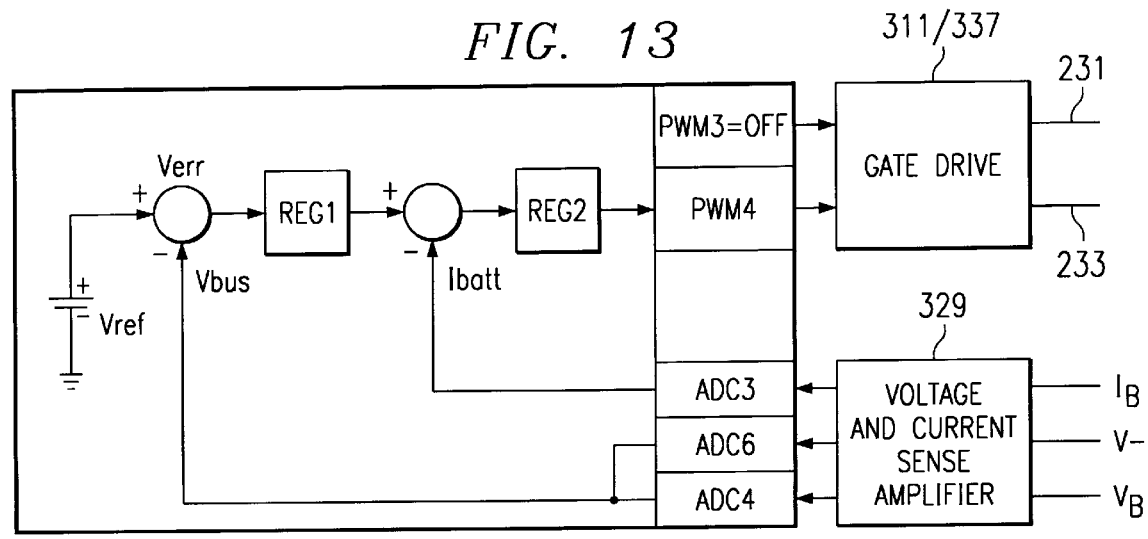
FIG. 13 illustrates the equivalent control process of the battery voltage boost performed by the digital signal processor.

FIG. 13 illustrated the equivalent control process of the battery voltage boost performed by the digital signal processor. Two signals are required two implement the control algorithm, the battery inductor current $I_B$ and the DC bus voltage $V_{bus}$. The bus voltage $V_{bus}$ is measured indirectly by forming the difference of the two bus capacitor voltages V+ and V–. The sensed signals V+, V– and $I_B$ are supplied to digital signal processor 360 by the three ADC channels ADC5, ADC6 and ADC3, respectively. The bus voltage $V_{bus}$ is calculated from the difference of the two voltages V+ and V–. This calculated voltage $V_{bus}$ is compared to the desired reference bus voltage $V_{ref}$. The difference $V_{err}$ is fed to a first compensator. The output of this first compensator is the reference current command for the inner current loop. This reference current is compared with digitized sensed battery current $I_{batt}$. The difference is passed to a second compensator as the command voltage, which is used to determine the duty cycle of the pulse width modulated signal PWM4. The pulse width modulated signal PWM4 drives the gate of transistor 251 via gate drive 311. Note that battery voltage boost is used as alternative to battery charging and operates only when there is no AC power supplied. Also note that pulse width modulated signal PWM3 turns transistor 241 off during battery voltage boost operation.

As previously described in conjunction with the flow charts of FIGS. 5 to 9, the control processes operate differently for voltage inputs than for current inputs. The current portions of the control processes illustrated in FIGS. 10 to 13 execute once each underflow of Timer1. In the preferred embodiment this occurs once each 50 microseconds corresponding to a frequency of 20 KHZ. The voltage portions of the control processes illustrated in FIG. 10 to 13 execute only once each underflow of Timer2. This is preferably once each 100 microseconds corresponding to a frequency of 10 KHZ. As illustrated in FIGS. 10 to 13 the current control portions of these control processes occur within inner loops and the voltage control portions occur within outer loops. The outer loop values update only once every two cycles of Timer1 while the inner loop values update every cycle of Timer1. Thus the voltage calculations of the control processes take place at half the frequency of the current calculations. This provides adequate performance while limiting the computation to within the computational capacity of as digital signal processor 360.

What is claimed is:
1. An uninterruptable power supply comprising:
an AC to DC conversion unit receiving an AC power input and generating a DC voltage on a DC bus;
a battery;
a battery charger connected to said DC bus and said battery for charging said battery from said DC bus when receiving AC power;
a battery boost circuit connected to said DC bus and said battery for supplying electric power on said DC bus from said battery when not receiving AC power;

a DC to AC inverter connected to said DC bus for generating AC power for a load from said DC bus; and a digital signal processor connected to said AC to DC conversion unit, said battery charger, said battery boost circuit and said DC to AC inverter, said digital signal processor programmed to periodically sense an input current, an input voltage, a battery current, a battery voltage, a first DC bus voltage, a second DC bus voltage, an output current and an output voltage, control said AC to DC conversion unit to present a stable input power factor to the AC power input via an inner current loop dependent upon an input current and an outer voltage loop dependent upon an input voltage, control said battery charger upon receipt of AC power via an inner current loop dependent upon a battery current and an outer voltage loop dependent upon a difference between a battery voltage and a first DC bus voltage, control said battery boost circuit upon failure of AC power via an inner current loop dependent upon said battery current and an outer voltage loop dependent upon a difference between said battery voltage and said first DC bus voltage, control said DC to AC inverter to supply stable AC power via an inner current loop dependent upon an output current and an outer voltage loop dependent upon an output voltage;

calculate said inner current loops in said controlling of said AC to DC conversion unit, said battery charger, said battery boost circuit and said DC to AC inverter each predetermined time interval, and calculate said outer voltage loops in said controlling of said AC to DC conversion unit, said battery charger, said battery boost circuit and said DC to AC inverter every two predetermined time intervals.

2. The uninterruptable power supply of claim 1, wherein:

said digital signal processor is programmed to alternately sense a first group of signals consisting of said input voltage, said input current, said output voltage and said output current and a second group of signals consisting of said battery voltage, said battery current, said first DC bus voltage and a second DC bus voltage.

3. The uninterruptable power supply of claim 2, wherein:

said digital signal processor includes a first repetitive interrupt timer capable of generating an interrupt upon counting to a first predetermined number and counting to a second predetermined number, said digital signal processor programmed to sense said first group of signals in response to said first repetitive interrupt timer counting to said first predetermined number, and sense said second group of signals in response to said first repetitive interrupt timer counting said second predetermined number.

4. The uninterruptable power supply of claim 3, wherein:

said digital signal processor includes a second repetitive interrupt timer having a time interval twice a time interval of said first repetitive interrupt timer, said digital signal processor programmed to calculate said inner current loops dependent upon sensed current in response to said first repetitive interrupt timer counting to said first predetermined number; and calculate said outer voltage loops dependent upon sensed voltage in response to said second repetitive interrupt timer counting to a third predetermined number.

5. A method of uninterruptable power supply comprising the steps of:

controlling input power factor presented to an AC power input of an AC to DC conversion unit via an inner current loop dependent upon an input current and an outer voltage loop dependent upon an input voltage;

controlling battery charging upon receipt of AC power via an inner current loop dependent upon a battery current and an outer voltage loop dependent upon a difference between a battery voltage and a first DC bus voltage;

controlling battery boost voltage upon failure of AC power via an inner current loop dependent upon said battery current and an outer voltage loop dependent upon a difference between said battery voltage and said first DC bus voltage;

controlling DC to AC inversion via an inner current loop dependent upon an output current and an outer voltage loop dependent upon an output voltage;

calculating said inner current loops in said controlling of said input power factor, said battery charging, said battery voltage boost and said DC to AC inversion once each predetermined time interval; and calculating said outer voltage loops in said controlling of said input power factor, said battery charging, said battery voltage boost and said DC to AC inversion every two predetermined time intervals.

6. The method of uninterruptable power supply of claim 5, further comprising:

alternately sensing a first group of signals consisting of said input voltage, said input current, said output voltage and said output current and a second group of signals consisting of said battery voltage, said battery current, said first DC bus voltage and a second DC bus voltage.

7. The method of uninterruptable power supply of claim 5, wherein:

said step of alternately sensing a first group of signals and a second group of signals includes sensing said first group of signals in response to a repetitive interrupt timer counting to a first predetermined number and sensing said second group of signals in response to the repetitive interrupt timer counting to a second predetermined number different from the first predetermined number.

8. The method of uninterruptable power supply of claim 5, wherein:

said step of calculating said inner current loops includes calculation of control parameters dependent upon sensed current in response to a first repetitive interrupt timer reaching a first predetermined number; and said step of calculating said outer voltage loops includes calculation of control parameters dependent upon sensed voltage in response to a second repetitive interrupt timer counting to a second predetermined number, said second repetitive interrupt timer having a repeat interval twice a repeat interval of the first repetitive interrupt timer.

* * * * *